United States Patent
Kumar et al.

(10) Patent No.: US 9,265,083 B2
(45) Date of Patent: Feb. 16, 2016

(54) SYSTEM AND METHOD FOR RADIO LINK RECOVERY

(75) Inventors: Vanitha A. Kumar, San Diego, CA (US); Bhupesh M. Umatt, Poway, CA (US); Swaminathan Sureshchandran, San Diego, CA (US); Amit Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 12/649,154

(22) Filed: Dec. 29, 2009

(65) Prior Publication Data

US 2011/0159880 A1 Jun. 30, 2011

(51) Int. Cl.
*H04W 4/00* (2009.01)
*H04W 76/02* (2009.01)
*H04W 48/18* (2009.01)

(52) U.S. Cl.
CPC ............ *H04W 76/028* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 6,445,918 | B1 | 9/2002 | Hellander |
| 7,437,178 | B2 | 10/2008 | Jeong et al. |
| 7,957,739 | B2 * | 6/2011 | Jeong et al. ............... 455/436 |
| 2005/0096051 | A1 * | 5/2005 | Lee et al. ............... 455/438 |
| 2006/0166694 | A1 * | 7/2006 | Jeong et al. ............... 455/525 |
| 2006/0258386 | A1 * | 11/2006 | Jeong et al. ............... 455/525 |
| 2007/0260851 | A1 * | 11/2007 | Taha et al. ............... 712/204 |
| 2008/0108346 | A1 | 5/2008 | Umatt et al. |
| 2008/0119186 | A1 * | 5/2008 | Song et al. ............... 455/436 |
| 2008/0200146 | A1 * | 8/2008 | Wang et al. ............... 455/410 |
| 2008/0200171 | A1 | 8/2008 | Jeong et al. |
| 2008/0220784 | A1 * | 9/2008 | Somasundaram et al. .... 455/437 |
| 2008/0227453 | A1 * | 9/2008 | Somasundaram et al. .... 455/436 |
| 2008/0253332 | A1 * | 10/2008 | Ore et al. ............... 370/331 |
| 2009/0023448 | A1 * | 1/2009 | Attar et al. ............... 455/436 |
| 2009/0034452 | A1 * | 2/2009 | Somasundaram et al. .... 370/328 |

(Continued)

FOREIGN PATENT DOCUMENTS

| | | |
|---|---|---|
| JP | 2004112148 | 4/2004 |
| WO | 2009020362 A2 | 2/2009 |

(Continued)

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 9)" 3GPP Standard; 3GPP TS 36.331, 3rd Generation Partnership Project (3GPP), Mobile Competence Centre; 650. Route Des Lucioles ; F-06921 Sophia-Antipolis Cedex; France, No. V9.0.0, Sep. 1, 2009, pp. 1-205, XP050377651.

(Continued)

*Primary Examiner* — Bob Phunkulh
(74) *Attorney, Agent, or Firm* — Anthony R. Morris

(57) ABSTRACT

Devices and methods are provided for expedited recovery from radio link failure or the like. In one embodiment, the method involves collecting at least one optional system information block (SIB) during connected mode, wherein the at least one optional SIB comprising neighbor information. In another embodiment, the method involves storing dedicated information provided by a base station through a dedicated channel. The method generally involves using the neighbor information and/or dedicated information for cell selection, in response to the radio link failure.

64 Claims, 13 Drawing Sheets

(56) References Cited

U.S. PATENT DOCUMENTS

| | | |
|---|---|---|
| 2009/0067386 A1 | 3/2009 | Kitazoe |
| 2009/0088154 A1* | 4/2009 | Umatt et al. ............... 455/434 |
| 2010/0130205 A1* | 5/2010 | Jung et al. ............... 455/435.2 |
| 2010/0130215 A1* | 5/2010 | Jung et al. ............... 455/450 |
| 2011/0098052 A1* | 4/2011 | Jung et al. ............... 455/450 |

FOREIGN PATENT DOCUMENTS

| | | |
|---|---|---|
| WO | 2009020926 A1 | 2/2009 |
| WO | 2009043002 | 4/2009 |
| WO | WO2009096883 | 6/2009 |

OTHER PUBLICATIONS

International Search Report and Written Opinion—PCT/US2010/024175, International Search Authority—European Patent Office—Sep. 27, 2010.

Taiwan Search Report—TW099104867—TIPO—Mar. 5, 2013.

QUALCOMM Europe: "Further evaluation of mobility performance in LT", 3GPP TSG-RAN WG1#56b R1-091446, Mar. 27, 2009.

* cited by examiner

SYSTEM AND METHOD FOR RADIO LINK RECOVERY

BACKGROUND

1. Field

The present application relates generally to wireless communications, and more specifically to methods and systems for expediting recovery from an out-of-service event.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a Multiple-In-Multiple-Out (MIMO) system.

Access Terminal (ATs), also referred to as cellular/mobile devices or handsets, or User Equipment (UE), are typically configured to connect to a base station in order to utilize available wireless services. ATs can include, for example, cellular phones, smart phones, laptops, handheld communication devices, handheld computing devices, satellite radios, navigational devices, Personal Digital Assistants (PDAs), or any other suitable device for communicating over a wireless communication system. Inevitably, situations arise when there is outage during radio link failure or the like. Typically, the AT responds to such an out-of-service event (e.g., radio link failure) by doing a blind full band search for available base stations, which may be time-consuming and inefficient. Accordingly, there is a need for an improved method and system for expediting radio link recovery.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a first method for expedited recovery from an out-of-service event (e.g., a radio link failure). For example, the method may involve collecting at least one optional system information block (SIB) during connected mode and/or idle mode, wherein the at least one optional SIB may include neighbor information. The method may involve using the neighbor information of the at least one optional SIB to perform cell selection, in response to an occurrence of the out-of-service event.

In related aspects, the method may involve prioritizing the neighbor information to be used for performing the cell selection, such as, for example, by giving higher priority to ones of the neighbor information that are more current. In further related aspects, the method may involve storing dedicated information provided by a base station (e.g., a macro base station, an AP base station, or an eNB) through a dedicated channel. The method may further involve utilizing a combination of the neighbor information and the dedicated information to perform the cell selection.

In accordance with one or more embodiments and corresponding disclosure thereof, various aspects are described in connection with a second method for expedited recovery from an out-of-service event. For example, the method may involve storing dedicated information from a DSM or the like provided by a base station during connected mode, and utilizing the dedicated information to perform cell selection in response to an occurrence of the out-of-service event.

In related aspects, the method may involve prioritizing the dedicated information to be used for the cell selection, such as, for example, by giving higher priority to the dedicated neighbor information relative to neighbor information. In further related aspects, the method may involve collecting at least one optional SIB, wherein the at least one optional SIB comprises neighbor information, and using a combination of the neighbor information and the dedicated information for the cell selection.

It is noted that the first and/or second methods that are described above may be performed by an AT. The neighbor information may be for a defined RAT, such as, for example, LTE. The defined RAT may be different from an AT RAT running on the AT, thereby allowing the cell selection across multiple RATs.

In accordance with one or more embodiments and corresponding disclosure thereof, various aspects are described in connection with devices and apparatuses for expedited recovery from a radio link failure or the like. In a first embodiment, the apparatus may include a means for collecting at least one optional SIB, wherein the at least one optional SIB may comprise neighbor information or the like. The apparatus may include a means for using the neighbor information to perform cell selection, in response to an occurrence of the out-of-service event.

In a second embodiment, the apparatus may include a means for storing dedicated information provided by a base station through a dedicated channel, and a means for utilizing the dedicated information to perform cell selection, in response to an occurrence of the out-of-service event.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
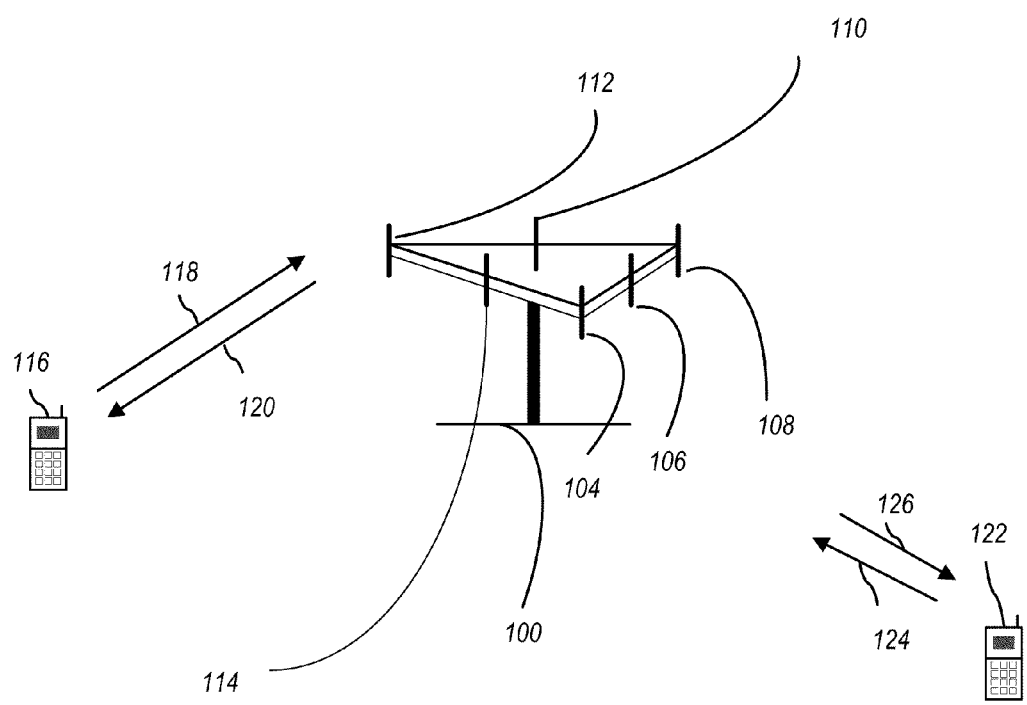
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

SC-FDMA systems utilize single carrier modulation and frequency domain equalization, and may have similar performance and essentially the same overall complexity as those of OFDMA systems. A SC-FDMA signal generally has lower Peak-to-Average Power Ratio (PAPR) because of its inherent single carrier structure. SC-FDMA has drawn great attention, especially for uplink communications where lower PAPR greatly benefits the mobile terminal in terms of transmit power efficiency, and is currently a working assumption for uplink multiple access schemes in 3GPP LTE or Evolved UTRA. For the purposes of the present document, the following abbreviations apply:

AM Acknowledged Mode
AMD Acknowledged Mode Data
ARQ Automatic Repeat Request
BCCH Broadcast Control Channel
BCH Broadcast Channel
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL Downlink
DL-SCH Downlink Shared Channel
DSCH Downlink Shared Channel
DTCH Dedicated Traffic Channel
FACH Forward link Access Channel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN Multicast Broadcast Single Frequency Network
MCE MBMS Coordinating Entity
MCH Multicast Channel
MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging Channel
PDCCH Physical Downlink Control Channel
PDSCH Physical Downlink Shared Channel
PDU Protocol Data Unit
PHY Physical layer
PhyCH Physical Channel
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
UE User Equipment
UL Uplink
UM Unacknowledged Mode
UMD Unacknowledged Mode Data
UMTS Universal Mobile Telecommunications System UTRA UMTS Terrestrial Radio Access UTRAN UMTS Terrestrial Radio Access Network Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the AP. In the embodiment, antenna groups each are designed to communicate to access terminals in a sector of the areas covered by AP 100. In communication over forward links 120 and 126, the transmitting antennas of AP 100 utilize beamforming in order to improve the signal-to-noise ratio of forward links for the different access terminals 116 and 124. Also, an AP using beamforming to transmit to access terminals scattered randomly through its coverage causes less interference to access terminals in neighboring cells than an AP transmitting through a single antenna to all its access terminals.

In accordance with aspects of the embodiments described herein, there is provided a multiple-in-multiple-out (MIMO) system that employs multiple (NT) transmit antennas and multiple (NR) receive antennas for data transmission. A MIMO channel formed by the NT transmit and NR receive antennas may be decomposed into NS independent channels, which are also referred to as spatial channels, where NS min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 2:
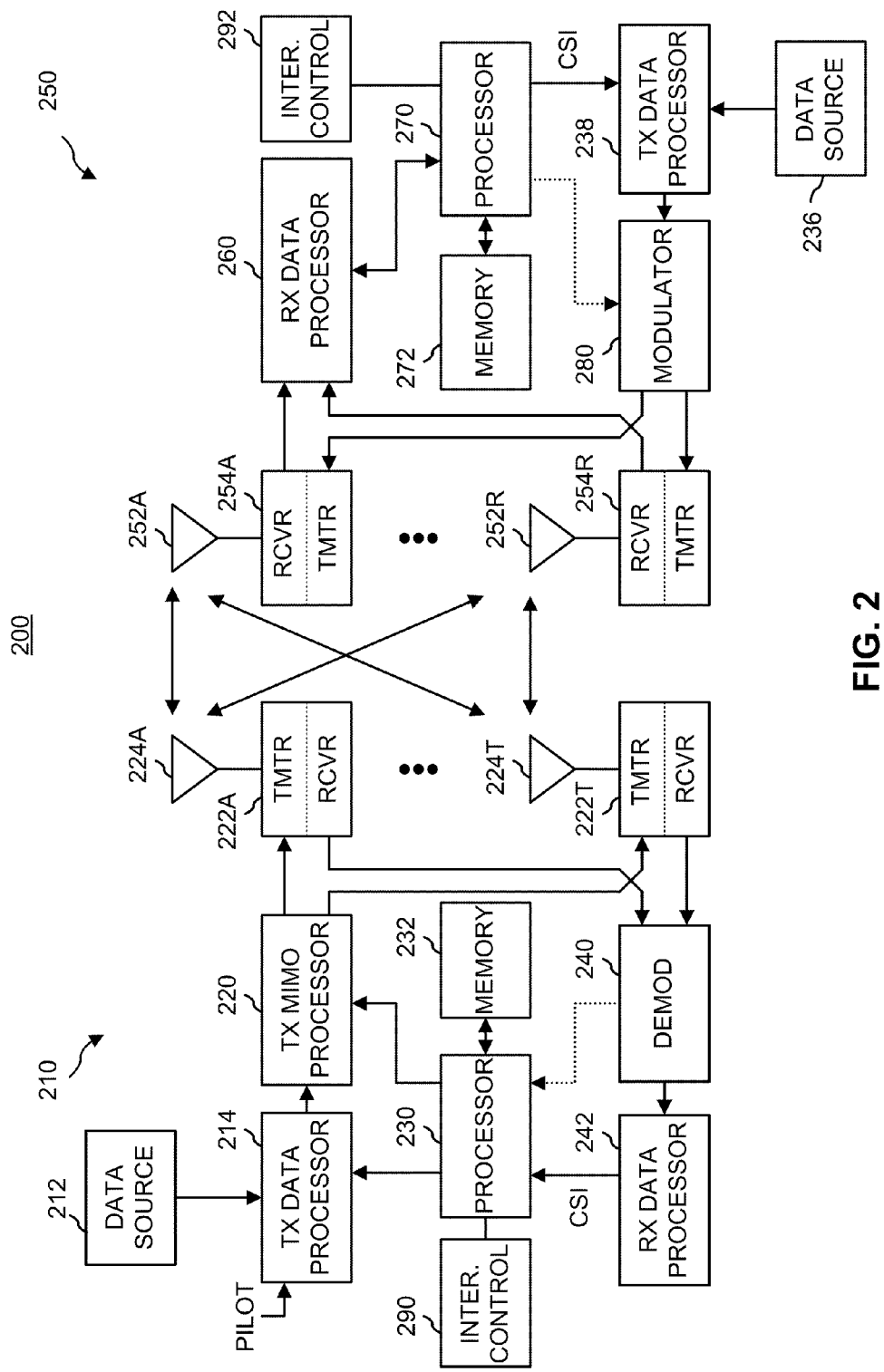
FIG. 2 illustrates a block diagram of a communication system.

The teachings herein may be incorporated into a node (e.g., a device) employing various components for communicating with at least one other node. FIG. 2 depicts several sample components that may be employed to facilitate communication between nodes. Specifically, FIG. 2 illustrates a wireless device 210 (e.g., an access point) and a wireless device 250 (e.g., an access terminal) of a MIMO system 200. At the device 210, traffic data for a number of data streams is provided from a data source 212 to a transmit ("TX") data processor 214.

In some aspects, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase-Shift Keying (QPSK), M-ary Phase Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222A through 222T are then transmitted from $N_T$ antennas 224A through 224T, respectively.

At the device 250, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the device 210.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the device 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the device 250 are received by the antennas 224, conditioned by the transceivers 222, demodulated by a demodulator ("DE- MOD") 240, and processed by a RX data processor 242 to extract the reverse link message transmitted by the device 250. The processor 230 then determines which pre-coding matrix to use for determining the beam-forming weights then processes the extracted message.

FIG. 2 also illustrates that the communication components may include one or more components that perform interference control operations as taught herein. For example, an interference ("INTER.") control component 290 may cooperate with the processor 230 and/or other components of the device 210 to send/receive signals to/from another device (e.g., device 250) as taught herein. Similarly, an interference control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the interference control component 290 and the processor 230 and a single processing component may provide the functionality of the interference control component 292 and the processor 270.

In accordance with one aspect of the embodiments described herein, logical channels may be classified into Logical Control Channels and Logical Traffic Channels. The Logical Control Channels may comprise: a BCCH which is a DL channel for broadcasting system control information; a PCCH which is a DL channel that transfers paging information; and/or a MBMS point-to-multipoint Control Channel which is a point-to-multipoint DL channel used for transmitting MBMS scheduling and control information for one or several MTCHs. Generally, after establishing an RRC connection this channel is used by ATs that receive MBMS. In the alternative, or in addition, the Logical Control Channels may comprise DCCH which is a point-to-point bi-directional channel that transmits dedicated control information, and may be used by ATs having an RRC connection. In accordance with another aspect of the embodiments described herein, the Logical Traffic Channels may comprise: a DTCH which is a point-to-point bi-directional channel, dedicated to one AT for the transfer of user information; and/or a MTCH which is a point-to-multipoint DL channel for transmitting traffic data.

In accordance with one aspect, Transport Channels may be classified into DL and UL. The DL Transport Channels may comprise: a BCH, a Downlink Shared Data Channel (DL-SDCH) and a PCH, the PCH for support of AT power saving (DRX cycle is indicated by the network to the AT), broadcasted over entire cell and mapped to PHY resources which can be used for other control/traffic channels. The UL Transport Channels may comprise a RACH, a Request Channel (REQCH), an Uplink Shared Data Channel (UL-SDCH), and/or a plurality of PHY channels. The PHY channels may comprise a set of DL channels and UL channels.

The DL PHY channels may comprise: a Common Pilot Channel (CPICH); Synchronization Channel (SCH); a CCCH; a Shared DL Control Channel (SDCCH); a Multicast Control Channel; a Shared UL Assignment Channel (SUACH); an Acknowledgement Channel (ACKCH); a DL Physical Shared Data Channel (DL-PSDCH); an UL Power Control Channel (UPCCH); a Paging Indicator Channel (PICH); and/or a Load Indicator Channel (LICH).

The UL PHY channels may comprise: a Physical Random Access Channel (PRACH); a Channel Quality Indicator Channel (CQICH); an ACKCH; an Antenna Subset Indicator Channel (ASICH); a Shared Request Channel (SREQCH); an UL Physical Shared Data Channel (UL-PSDCH); and/or a Broadband Pilot Channel (BPICH).

In related aspects, a channel structure is provided that preserves low Peak-to-Average Power Ratio (PAR) (at any given time, the channel is contiguous or uniformly spaced in frequency) properties of a single carrier waveform.

In some aspects, the teachings herein may be employed in a network that includes macro scale coverage (e.g., a large area cellular network such as a 3G network, typically referred to as a macro cell network) and smaller scale coverage (e.g., a residence-based or building-based network environment). As an AT moves through such a network, the AT may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, evolved Node B (eNodeB), macro cell, and so on. Also, a femto node may be configured or referred to as a Home Node B (HNB), Home evolved Node B (eNodeB), AP base station, femto cell, and so on.

Figure 3A:
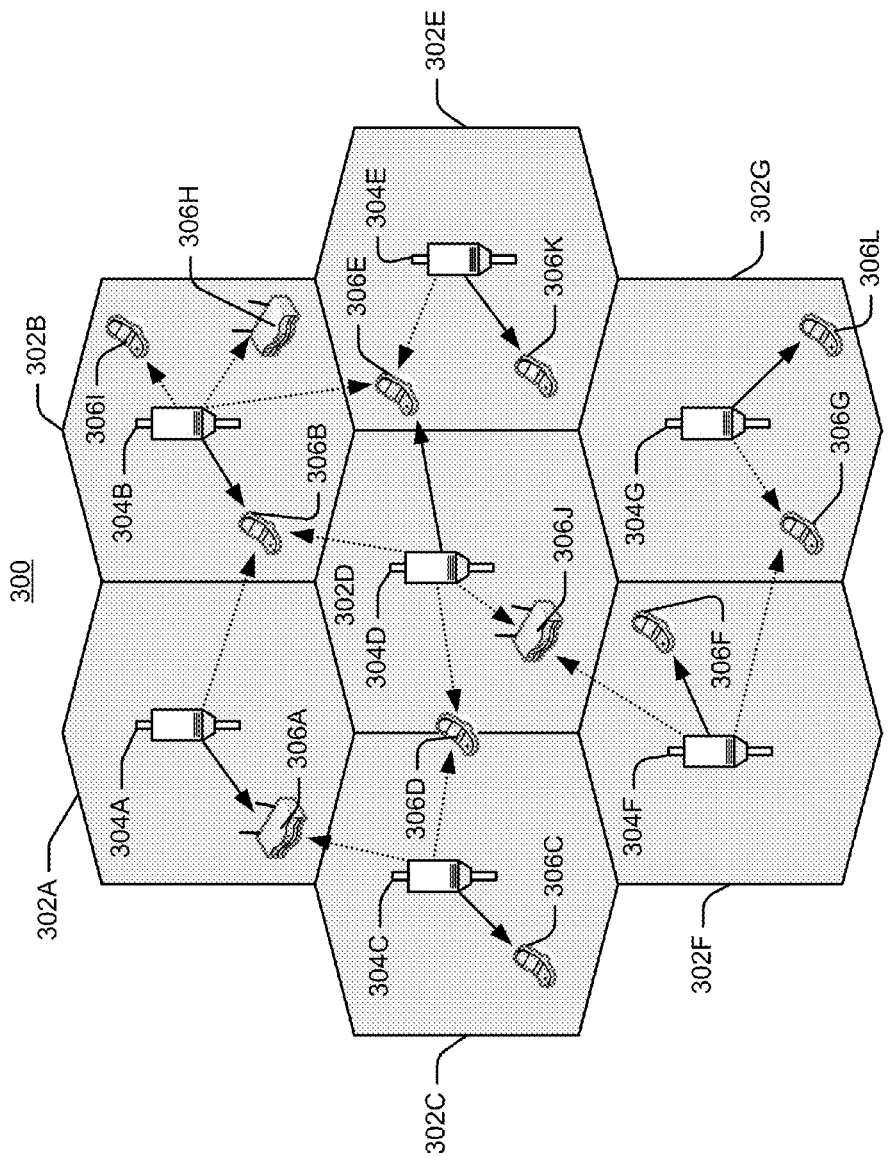
FIGS. 3A-C illustrate aspects of deployment of access point base stations within a network environment.

FIG. 3A illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). As shown in FIG. 3, access terminals 306 (e.g., access terminals 306A-306L) may be dispersed at various locations throughout the system over time. Each access terminal 306 may communicate with one or more access nodes 304 on a forward link and/or a reverse link at a given moment, depending upon whether the access terminal 306 is active and whether it is in soft handoff, for example. The wireless communication system 300 may provide service over a large geographic region. For example, macro cells 302A-302G may cover a few blocks in a neighborhood.

Figure 3B:
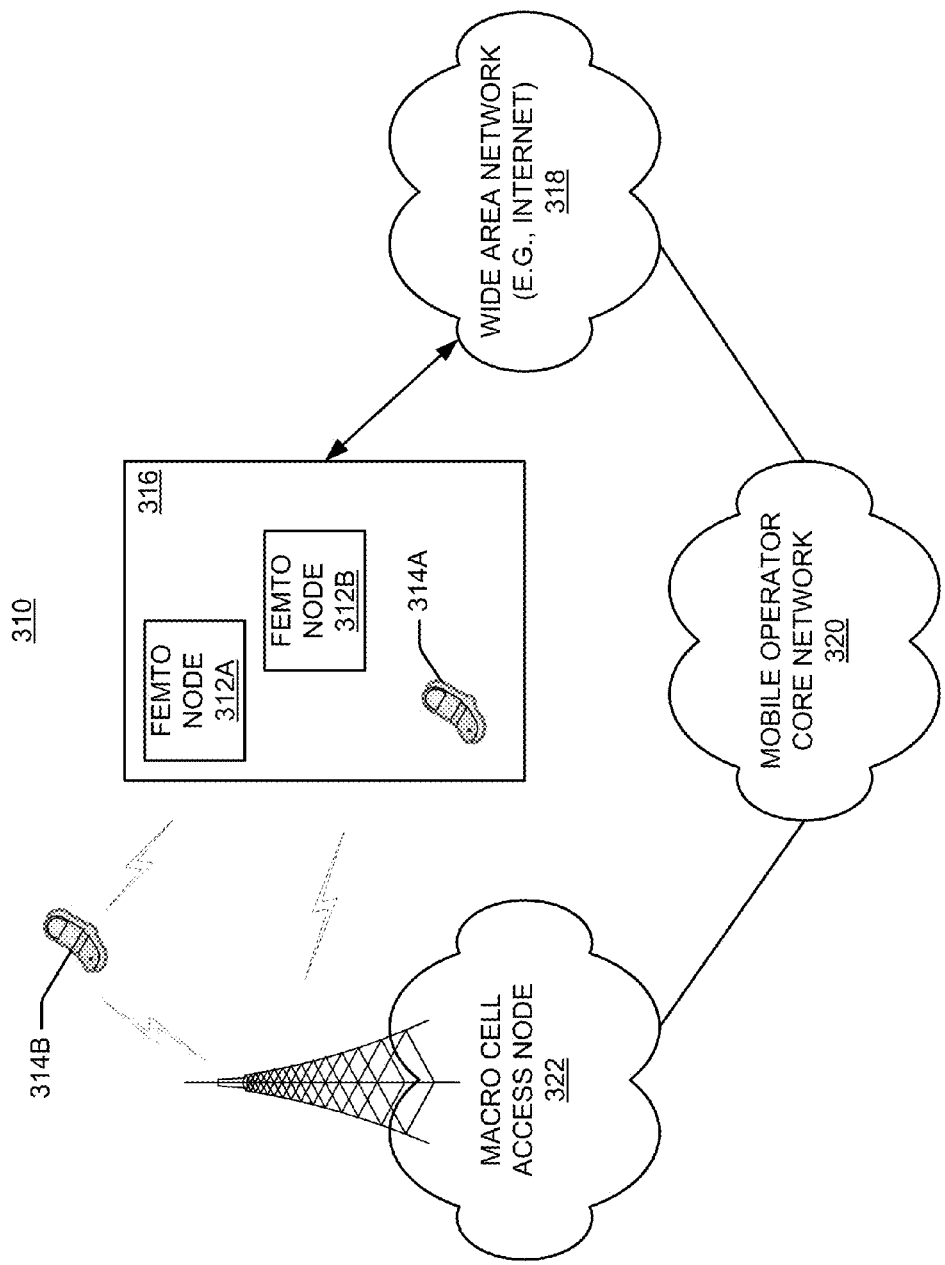

FIG. 3B illustrates an exemplary communication system 310 where one or more femto nodes are deployed within a network environment. Specifically, the system 310 includes multiple femto nodes 312 (e.g., femto nodes 312A and 312B) installed in a relatively small scale network environment (e.g., in one or more user residences 316). Each femto node 312 may be coupled to a wide area network 318 (e.g., the Internet) and a mobile operator core network 320 via a DSL router, a cable modem, a wireless link, or other connectivity means (not shown). As will be discussed below, each femto node 312 may be configured to serve associated access terminals 314 (e.g., access terminal 314A) and, optionally, alien access terminals 314 (e.g., access terminal 314B). In other words, access to femto nodes 312 may be restricted whereby a given access terminal 314 may be served by a set of designated (e.g., home) femto node(s) 312 but may not be served by any non-designated femto nodes 312 (e.g., a neighbor's femto node 312).

Figure 3C:
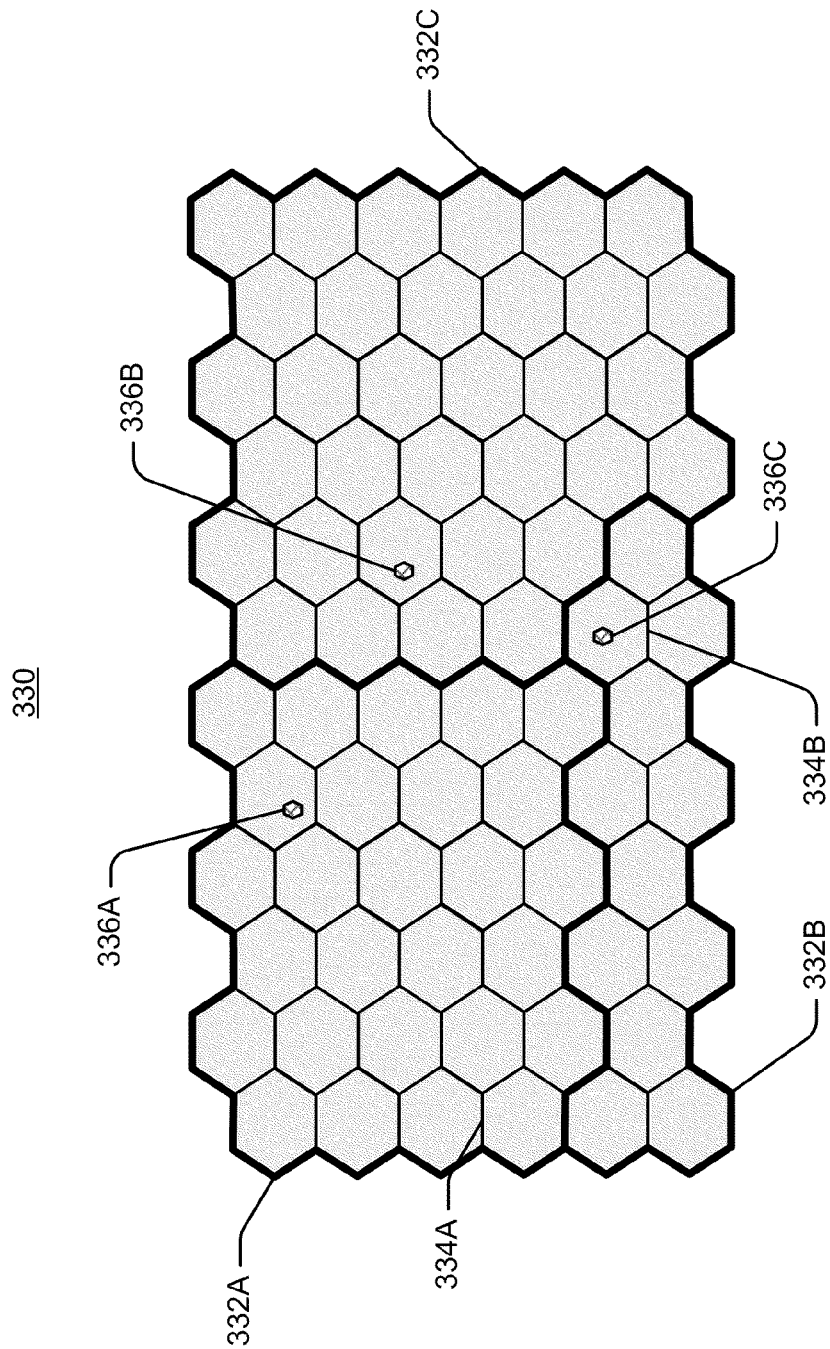

FIG. 3C illustrates an example of a coverage map 330 where several tracking areas 332 (or routing areas or location areas) are defined, each of which includes several macro coverage areas 334. Here, areas of coverage associated with tracking areas 332A, 332B, and 332C are delineated by the wide lines and the macro coverage areas 334 are represented by the hexagons. The tracking areas 332 also include femto coverage areas 336. In this example, each of the femto coverage areas 336 (e.g., femto coverage area 336C) is depicted within a macro coverage area 334 (e.g., macro coverage area 334B). It should be appreciated, however, that a femto coverage area 336 may not lie entirely within a macro coverage area 334. In practice, a large number of femto coverage areas 336 may be defined with a given tracking area 332 or macro coverage area 334. Also, one or more pico coverage areas (not shown) may be defined within a given tracking area 332 or macro coverage area 334.

Referring again to FIG. 3B, the owner of a femto node 312 may subscribe to mobile service, such as, for example, 3G mobile service, offered through the mobile operator core network 320. In addition, an access terminal 314 may be capable of operating both in macro environments and in smaller scale (e.g., residential) network environments. In other words, depending on the current location of the access terminal 314, the access terminal 314 may be served by an access node 322 of the macro cell mobile network 320 or by any one of a set of femto nodes 312 (e.g., the femto nodes 312A and 312B that reside within a corresponding user residence 316). For example, when a subscriber is outside his home, he is served by a standard macro access node (e.g., node 322) and when the subscriber is at home, he is served by a femto node (e.g., node 312A). Here, it should be appreciated that a femto node 314 may be backward compatible with existing access terminals 314.

A femto node 312 may be deployed on a single frequency or, in the alternative, on multiple frequencies. Depending on the particular configuration, the single frequency or one or more of the multiple frequencies may overlap with one or more frequencies used by a macro node (e.g., node 322).

In some aspects, an access terminal 314 may be configured to connect to a preferred femto node (e.g., the home femto node of the access terminal 314) whenever such connectivity is possible. For example, whenever the access terminal 314 is within the user's residence 316, it may be desired that the access terminal 314 communicate only with the home femto node 312.

In some aspects, if the access terminal 314 operates within the macro cellular network 320 but is not residing on its most preferred network (e.g., as defined in a preferred roaming list), the access terminal 314 may continue to search for the most preferred network (e.g., the preferred femto node 312) using a Better System Reselection ("BSR"), which may involve a periodic scanning of available systems to determine whether better systems are currently available, and subsequent efforts to associate with such preferred systems. With the acquisition entry, the access terminal 314 may limit the search for specific band and channel. For example, the search for the most preferred system may be repeated periodically. Upon discovery of a preferred femto node 312, the access terminal 314 selects the femto node 312 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 312 that reside within the corresponding user residence 316). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

In accordance with aspects of the embodiments described herein, during handoff from a 1x cdma2000 macro access network (AN) to a femto AP, a femto convergence server (FCS) of network 350 acts as a target Mobile Switching Center (MSC) in the inter-system handoff procedure. The target femto AP may be uniquely identified by its global identifier, such as, for example, an IS-41 Cell Global Identifier (ICGI) to the source MSC. The ICGI may comprise an MSC identifier and/or a cell identifier (e.g., MSC_ID, Cell_ID). The source MSC may trigger a facilities directive message (e.g., FACDIR2) to the target FCS. It would be desirable for the target FCS to identify the femto AP using a Session Initiation Protocol (SIP) address of the Femto AP. In addition, the associated Serving Call Session Control Function (S-CSCF) and Proxy Call Session Control Function (P-CSCF) also need to be identified.

In one embodiment, the S-CSCF associated with the femto AP performs a third party registration with the FCS, sometimes referred to as the Mobile Application Part (MAP) Femto Interworking Function (MFIF), on behalf of the femto AP. For example, the FCS may assign a cell identifier (e.g., MSC_ID/Cell_ID) to the femto AP and may associate the femto AP's SIP contact address and the associated S-CSCF/P-CSCF addresses with the MSC_ID/Cell_ID. In the alternative, or in addition, a femto AP SIP contact address may be derived from the MSC_ID/Cell_ID assigned to the femto AP. During handoff, the femto AP SIP contact address may now be uniquely identified by the FCS given the target cell identifier (MSC_ID/Cell_ID) of the target femto AP during the handoff.

In accordance with one or more aspects of the embodiments described herein, there is provided a technique for storing and using system information for base stations (e.g., macro base stations or AP base stations) to achieve faster recovery from an out-of-service event (e.g., radio link failure). In one embodiment, ATs in an LTE system may obtain information regarding the configuration and capability of an evolved Node B unit (eNB) by receiving system information broadcasted by the eNB in a BCCH. The system information for the eNB may be divided into multiple blocks called System Information Blocks (SIBs).

When the AT is in idle mode, the AT is typically required to collect all of the SIBs transmitted by a corresponding eNB except for the ones of the SIBs belonging to a Radio Access Technology (RAT) that the AT does not support. In connected mode, however, the AT is only required to collect a subset of the SIBs, such as, for example, SIB-1, SIB-2, and SIB-8. The reason for this is that the eNB can transmit all other configuration and neighbor information through a dedicated signaling message (DSM). However, radio conditions may occur that cause the AT to quickly lose coverage before the DSM reaches the AT. As a result, the AT is at the mercy of the eNB to receive neighbor information or the like. The embodiments described herein bridge such information gaps by having the AT store and utilize the information available in the SIBs of a given eNB.

In a first recovery optimization approach, while the AT is in the connected mode, if the AT does not have all of the SIBs transmitted by the eNB, the AT will attempt to collect more than the mandatory SIBs, such as, for example, all of the SIBs or at least one optional SIB. In a second recovery optimization approach, if neighbor information is conveyed by the eNB through a DSM, the AT will store the neighbor information in the received DSM for a given period of time, even after the AT has been handed off from the eNB. Both of these approaches, whether performed separately or in conjunction with each other, will help the AT perform smarter cell selection in the event of an out-of-service event (e.g., radio link failure) in connected mode.

Figure 4:
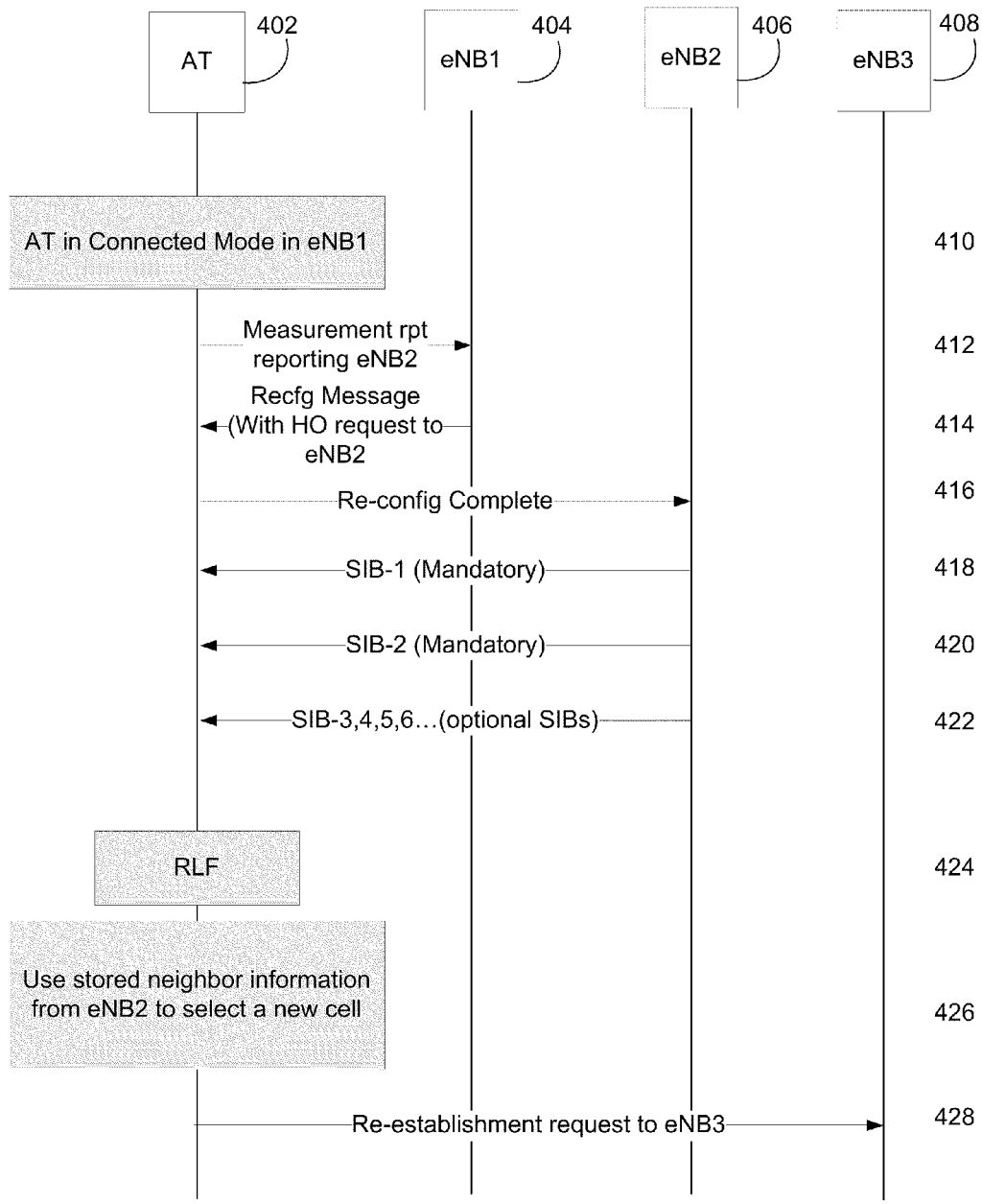
FIG. 4 illustrates a call flow diagram of a procedure for collecting at least one optional system information block, according to one embodiment of the invention.

With reference to FIG. 4, there is illustrated a call flow diagram 400 of an exemplary procedure performed by an AT 402 to collect the SIBs transmitted by eNB1 404 while in connected mode. At step 410, the AT 402 is in connected mode with eNB1 404. eNB1 404 may broadcast neighbor information via a DSM. At step 412, the AT 402 may send to eNB1 404 a measurement report that may include, among other things, a signal strength measurement of eNB2 406. At step 414, eNB1 404 may send a reconfiguration message to the AT 402, wherein the reconfiguration message may include a handoff to eNB2 request.

At step 416, the AT 402 may send a reconfiguration complete message to eNB2 406. At steps 418-422, eNB2 406 may broadcast a plurality of SIBs that include both mandatory and optional SIBs. During connected mode, the AT 402 typically listens to and stores the mandatory SIBs, such as, for example, SIB-1, SIB-2, and SIB-8 (see step 420 and 422). With the present approach, during connected mode, the AT 402 also receives and stores one or more optional SIBs, such as, for example, SIB-3, SIB-4, SIB-5, SIB-6, and/or SIB-7.

At step 424, a radio link failure or the like occur. For example, the AT 402 may be handed off from eNB1 404 to eNB2 406, but may hit a fade before dedicated information could be received on the new cell. If the AT 402 was able to successfully receive the system information containing the neighbor information (e.g., contained in one or more of the optional SIBs) from eNB2 406, then the AT 402 may search the cells from the neighbor list of eNB2 406 (step 426). Searching the cells from the neighbor list of eNB2 406 significantly increases the chances of AT 402 finding a strong cell (e.g., eNB3 408) for camping right away, thereby minimizing the radio outage. In the present example, at step 428, the AT 402 may send a reestablishment request message to eNB3 408, which is a neighbor of eNB2 406.

It is noted that, even if the cells in the neighbor list of the last visited eNB cannot be found, the bands and frequencies of the neighbors may be used for prioritizing among the various bands and frequencies that would have to be searched for cell selection.

Figure 5:
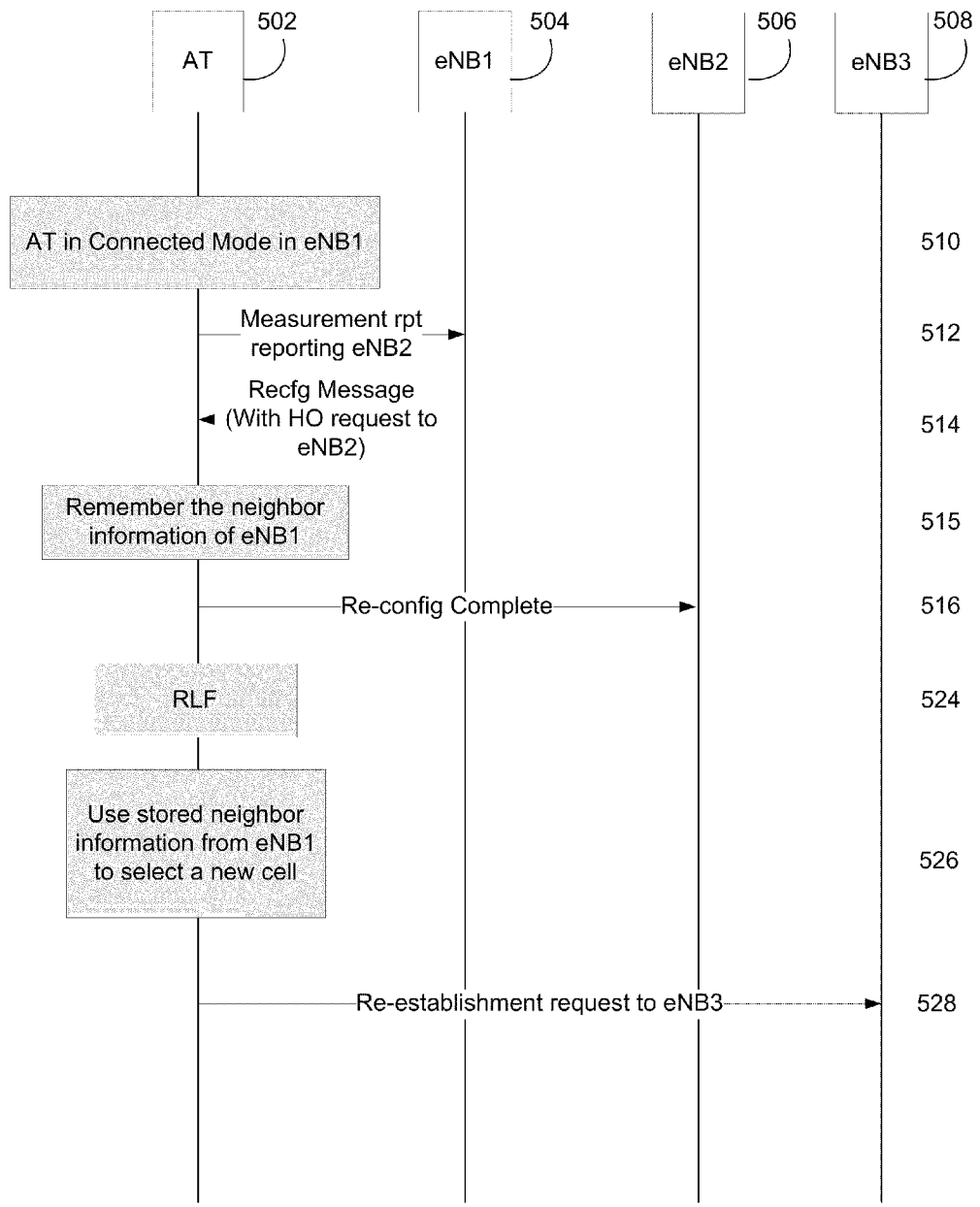
FIG. 5 illustrates a call flow diagram of a procedure for storing information in a dedicated signaling message, according to one embodiment of the invention.

With reference to FIG. 5, there is illustrated a call flow diagram 500 of an exemplary procedure performed by an AT 502 to receive and store neighbor information in a received DSM for a given period of time, even after the AT has been handed off from the eNB that broadcasted the DSM.

At step 510, the AT 502 is in connected mode with eNB1 504. eNB1 504 may broadcast neighbor information via a DSM. At step 512, the AT 502 may send to eNB1 504 a measurement report that may include, among other things, a signal strength measurement of eNB2 506. At step 514, eNB1 504 may send a reconfiguration message to the AT 502, wherein the reconfiguration message may include a handoff to eNB2 request.

At step 515, the AT 502 may store or remember the neighbor information of eNB1 504, such as, for example, neighbor information contained in the DSM received from eNB1 504. At step 516, the AT 502 may send a reconfiguration complete message to eNB2 506.

At step 524, a radio link failure or the like occur. For example, the AT 502 may be handed off from eNB1 504 to eNB2 506, but may hit a fade before eNB2 506 can send dedicated configuration or the AT 502 can receive the system information carrying this information. In such a scenario, information regarding the neighbors of the previous eNB (eNB1 504 in this example) can be very helpful. Instead of doing a blind full band search, the AT 502 can start with the neighbors of the eNB from which it was just handed off (step 526). In the present example, at step 528, the AT 502 may send a reestablishment request message to eNB3 508, which is a neighbor of eNB1 504.

It is noted that the neighboring cells are likely to be geographically closer to the AT 502, thereby increasing the probability of the AT 502 reestablishing radio link communication with a suitable cell. Again, even if the neighbor cells (e.g., eNB3 508) in the neighbor list of the last visited eNB (e.g., eNB1 504) cannot be found, the AT 502 may use the bands and frequencies of the neighbor cells may be used for doing a prioritized band search when doing cell selection.

In accordance with one or more aspects of the embodiments described herein, the first and second recovery optimization approaches described above, and shown in FIGS. 4 and 5, may be used in conjunction with each other, such that a given AT stores both (a) the first optimization data (e.g., at least one optional SIB) and (b) the second optimization data (e.g., neighbor information in a DSM).

For example, if the AT's searches for cells stored by using the stored first optimization data (e.g., the neighbor information in one or more optional SIBs) do not yield results, the AT may use the stored second optimization data (e.g., neighbor information in a DSM) for the search, and vice versa. If neither approach is successful, the AT may prioritize the frequencies/bands corresponding to the collective neighbors in the first and second optimization data. Such information (i.e., neighbor information from the last two visited cells) may also be used for future cell selection process(es). In one embodiment, only data that satisfies a given recentness/recency or freshness criteria may be used for cell selection. It is noted that the above described approaches help not just with radio link failure but also in situations where the AT is away from an LTE network and needs to start LTE acquisition again.

In related aspects, the above described first and/or second optimizations may also be used for prioritizing other RAT searches during an out-of-service event or cell selection. For example, during radio link failure, if the AT is unable to find cells in LTE, it may search the other RATs. If the AT has collected or stored neighbor information, the AT may use the inter-RAT neighbors stored in the neighbor list to prioritize the RATs to be searched. The frequency/band information from the neighbor list that the AT has stored using the first and/or second optimizations may be passed to the other RATs, which allows the other RAT to prioritize its frequency/band scan accordingly. In this way, the first and/or second optimization approaches described herein may be used to help with acquisition on a different RAT during the radio link failure or the like.

Figure 6A:
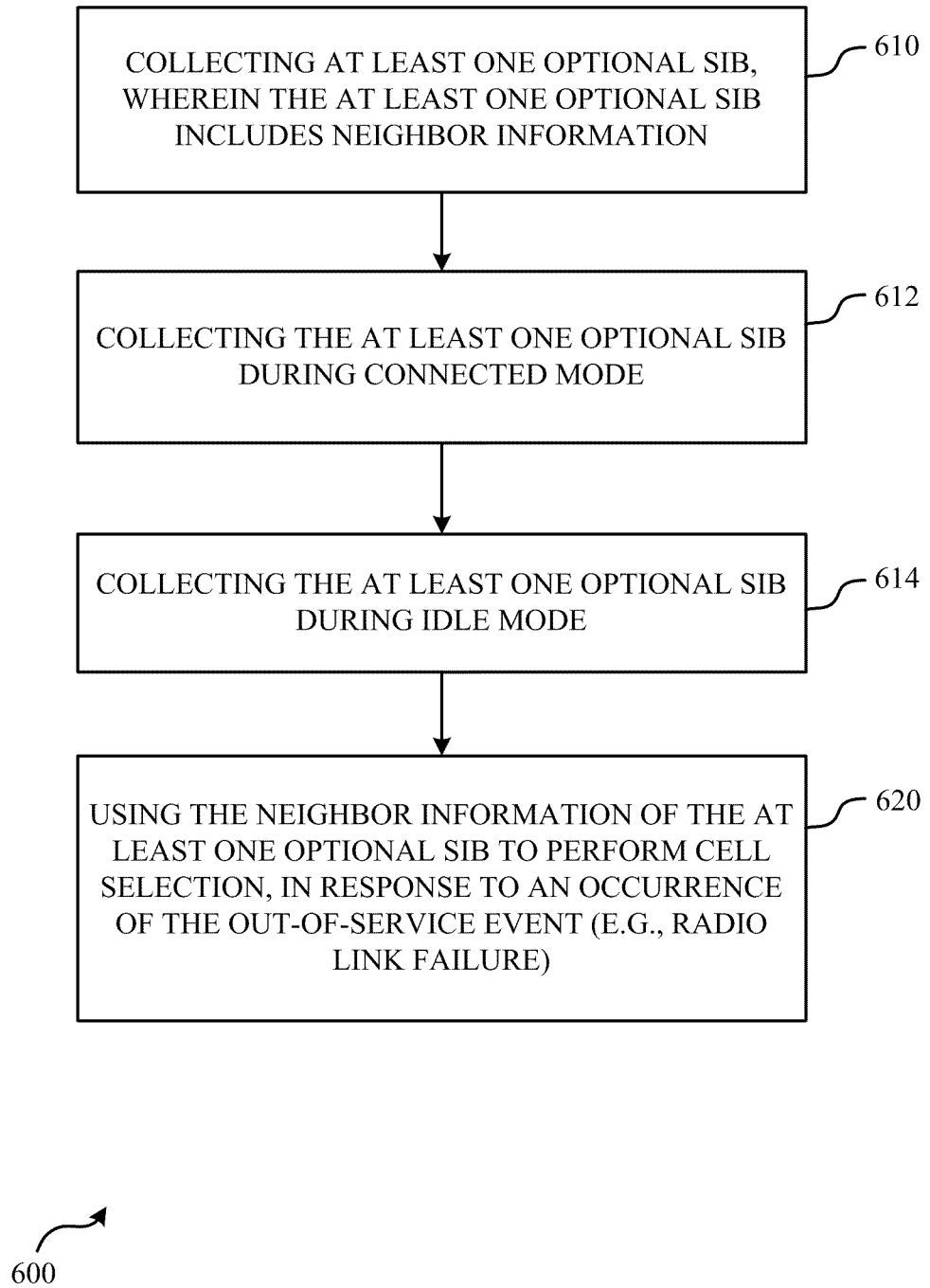
FIG. 6A shows one embodiment for a method for expedited recovery from an out-of-service event.

In accordance with one or more aspects of the embodiments described herein, there are provided methods for expedited recovery from an out-of-service event (e.g., a radio link failure). With reference to the embodiment of FIG. 6A, there is provided a first optimization method 600 for radio link recovery. The method 600 may involve, at step 610, collecting at least one optional system information block (SIB), wherein the at least one optional SIB may include neighbor information. The method 600 may involve, at step 620, in response to an occurrence of the out-of-service event, using the neighbor information of the at least one optional SIB to perform cell selection.

In related aspects, step 610 may comprise collecting the at least one optional SIB during connected mode (step 612). In the alternative, or in addition, step 610 may comprise collecting the at least one optional SIB during idle mode (step 614).

Figure 6B:
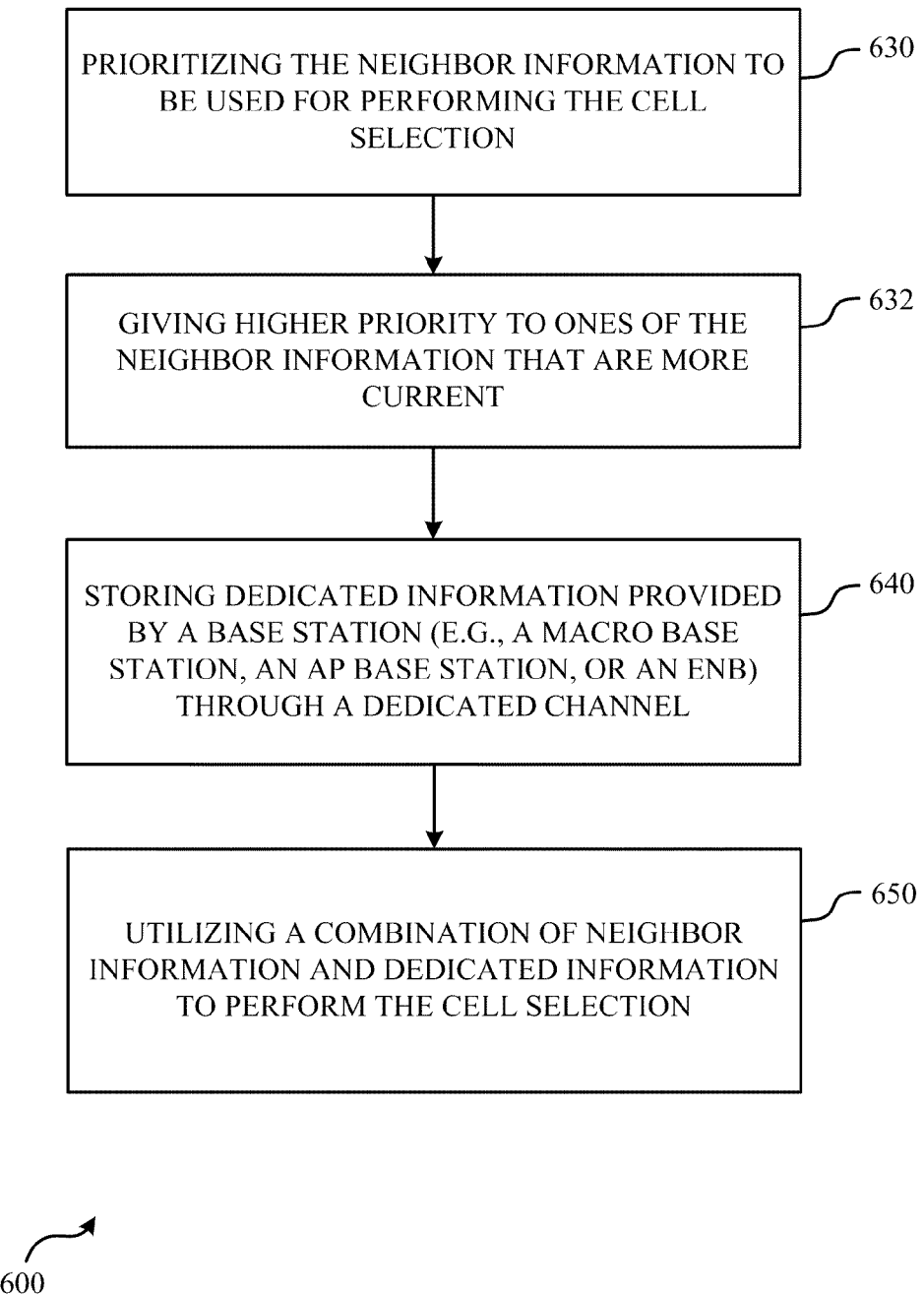
FIG. 6B shows sample aspects of the method shown in FIG. 6A.

With reference to FIG. 6B, in one embodiment, the method 600 may involve, at step 630, prioritizing the neighbor information to be used for performing the cell selection. Step 630 may comprise giving higher priority to ones of the neighbor information that are more current (step 632).

In related aspects, the method 600 may involve, at step 640, storing dedicated information provided by a base station (e.g., a macro base station, an AP base station, or an eNB) through a dedicated channel or the like. The method 600 may further involve, at step 650, utilizing a combination of the neighbor information and the dedicated information to perform the cell selection, in response to the occurrence of the out-of-service event.

In further related aspects, the method 600 may be performed by an AT. The neighbor information may be for a defined or specific RAT, such as, for example, LTE. The defined RAT may be different from an AT RAT running on or implemented by the AT, thereby allowing the cell selection across multiple RATs.

Figure 7A:
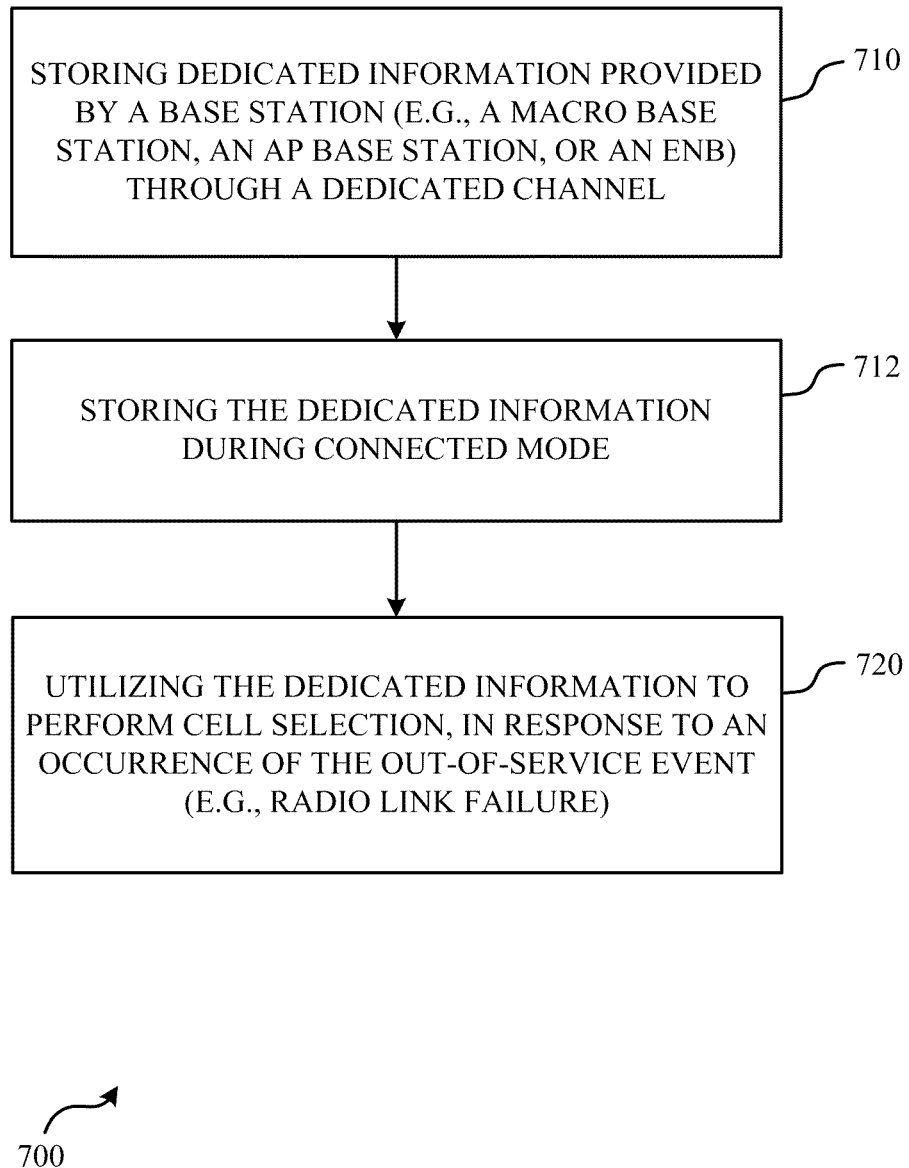
FIG. 7A shows another embodiment for a method for expedited recovery from an out-of-service event.

With reference to the embodiment of FIG. 7A, there is provided a second optimization method 700 for radio link recovery. The method 700 may involve, at step 710, storing dedicated information provided by a base station through a dedicated channel. The method 700 may involve, at step 720, in response to an occurrence of the out-of-service event, utilizing the dedicated information to perform cell selection. In related aspects, step 710 may comprise storing the dedicated information during connected mode (step 712).

Figure 7B:
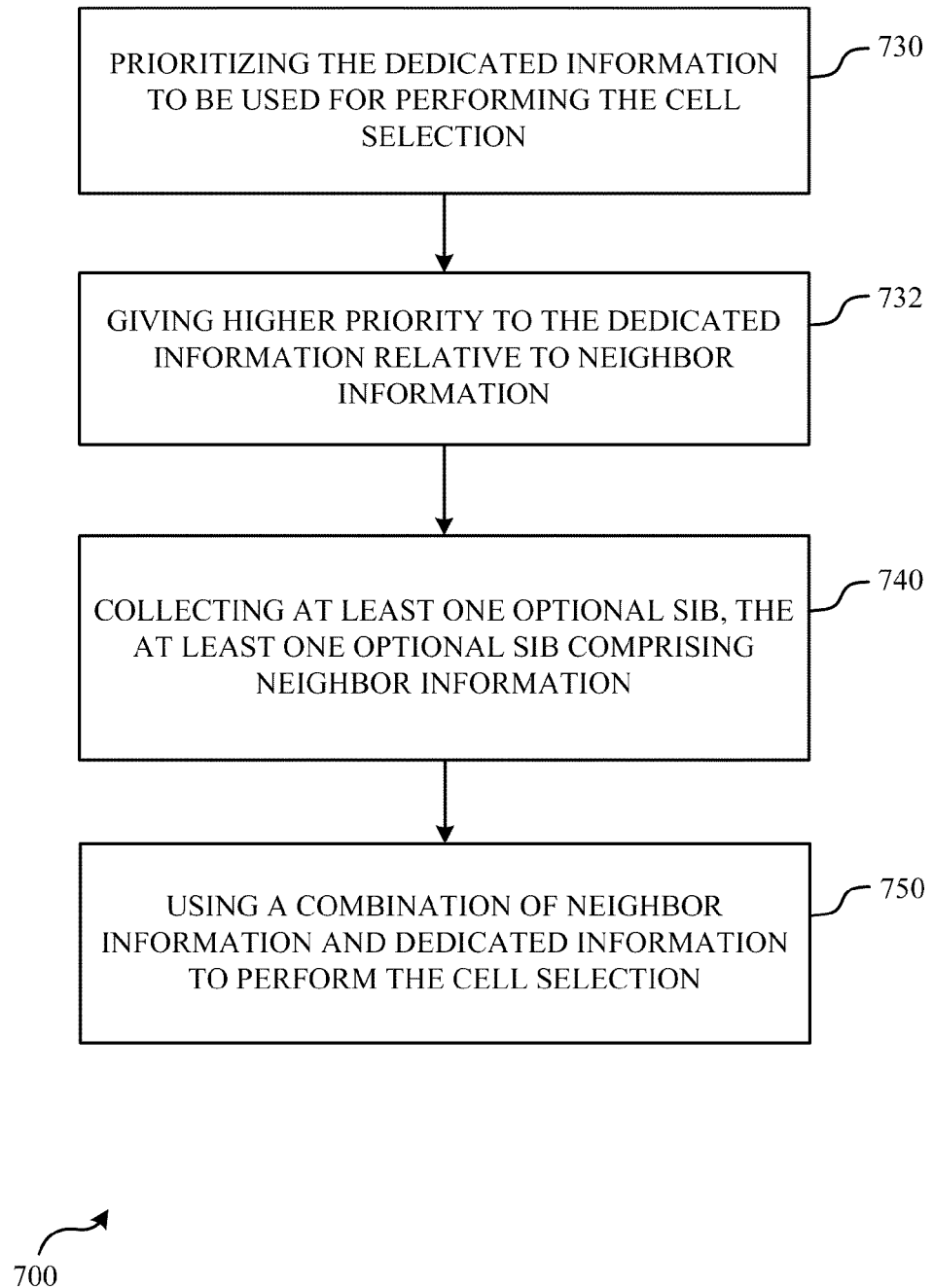
FIG. 7B shows sample aspects of the method shown in FIG. 7A.

With reference to FIG. 7B, in one embodiment, the method 700 may involve, at step 730, prioritizing the dedicated information to be used for performing the cell selection. Step 730 may comprise giving higher priority to the dedicated information relative to neighbor information (step 732).

In related aspects, the method 700, may involve, at step 740, collecting at least one optional SIB, the at least one optional SIB comprising neighbor information. The method 700 may further involve, at step 750, using a combination of the neighbor information and the dedicated information to perform the cell selection.

In further related aspects, the method 700 may be performed by an AT. The dedicated information may be for a defined RAT, such as, for example, LTE. The defined RAT may be different from an AT RAT running on the AT, thereby allowing the cell selection across multiple RATs.

Figure 8:
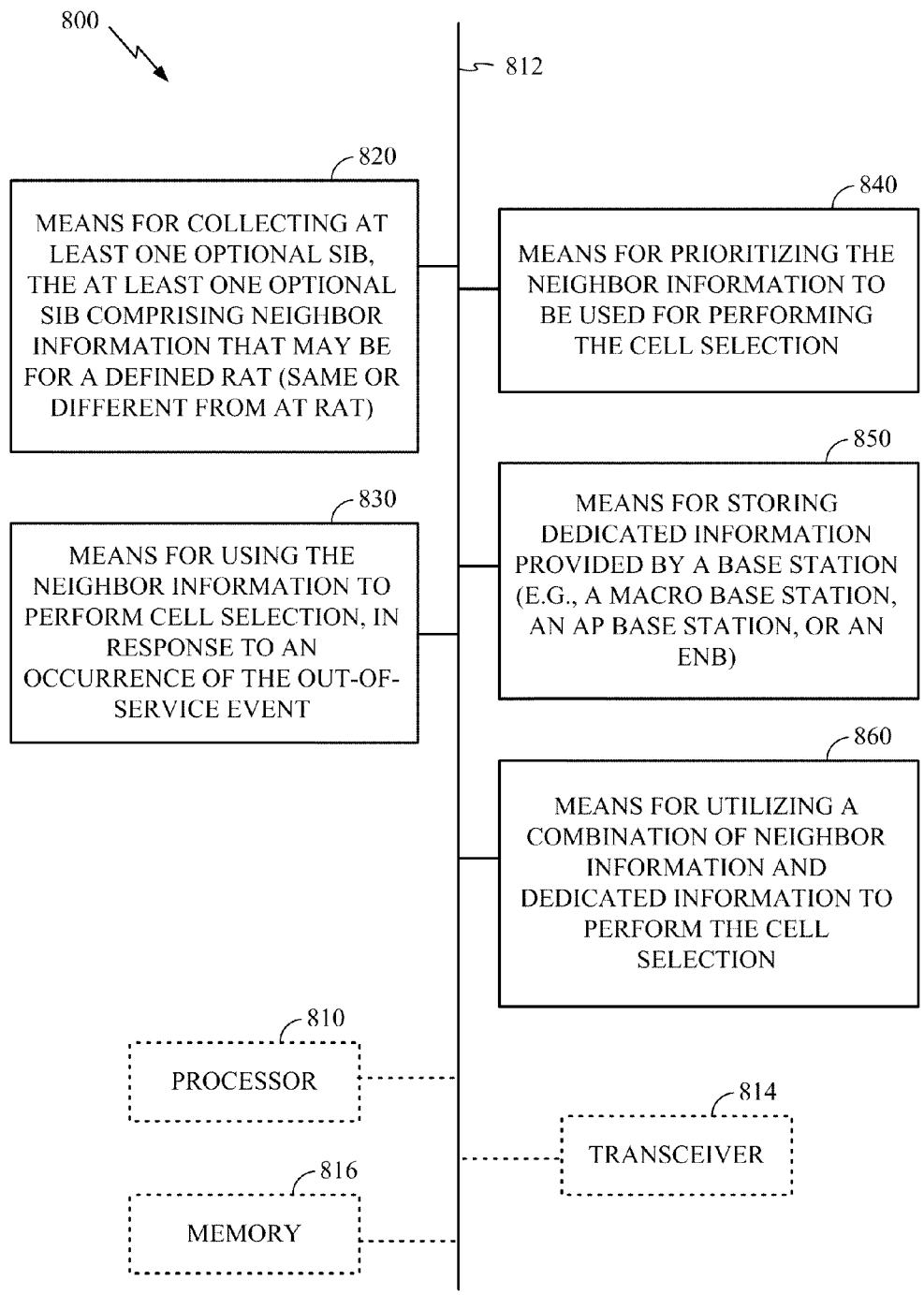
FIG. 8 illustrates one embodiment of an apparatus for expedited recovery from an out-of-service event.

In accordance with one or more aspects of the embodiments described herein, there are provided devices and apparatuses for expedited recovery from an out-of-service event (e.g., a radio link failure). With reference to FIG. 8, there is provided an exemplary apparatus 800 that implements a first recovery optimization technique, and that may be configured as either a communication device (e.g., an AT), or as a processor or similar device for use within a communication device.

As illustrated, apparatus 800 may comprise a means 820 for collecting at least one optional SIB (e.g., during connected mode), the at least one optional SIB comprising neighbor information. Apparatus 800 may comprise a means 830 for using the neighbor information to perform cell selection, in response to an occurrence of the out-of-service event.

In related aspects, apparatus 800 may comprise a means 840 for prioritizing the neighbor information to be used for performing the cell selection, such as, for example by giving higher priority to ones of the neighbor information that are more current.

In further related aspects, apparatus 800 may comprise a means 850 for storing dedicated information provided by a base station (e.g., a macro base station, an AP base station, or an eNB) through a dedicated channel, and a means 860 for utilizing a combination of the neighbor information and the dedicated information to perform the cell selection, in response to the occurrence of the out-of-service event.

It is noted that apparatus 800 may optionally include a processor module 810 having at least one processor, in the case of apparatus 800 configured as a communication network entity, rather than as a processor. Processor 810, in such case, may be in operative communication with means 820-860, and components thereof, via a bus 812 or similar communication coupling. Processor 810 may effect initiation and scheduling of the processes or functions performed by means 820-860, and components thereof Apparatus 800 may include a transceiver module 814 for communicating with other communication network entities, such as, for example, an eNB or the like. A stand alone receiver and/or stand alone transmitter may be used in lieu of or in conjunction with transceiver 814.

Apparatus 800 may optionally include a means for storing information, such as, for example, a memory device/module 816. Computer readable medium or memory device/module 816 may be operatively coupled to the other components of apparatus 800 via bus 812 or the like. The computer readable medium or memory device 816 may be adapted to store computer readable instructions and data for effecting the processes and behavior of means 820-860, and components thereof, or processor 810), or the methods disclosed herein.

The memory module 816 may optionally include executable code for the processor module 810 to (a) collecting at least one optional SIB, and (b) use the neighbor information to perform cell selection, in response to an occurrence of the out-of-service event or the like.

Figure 9:
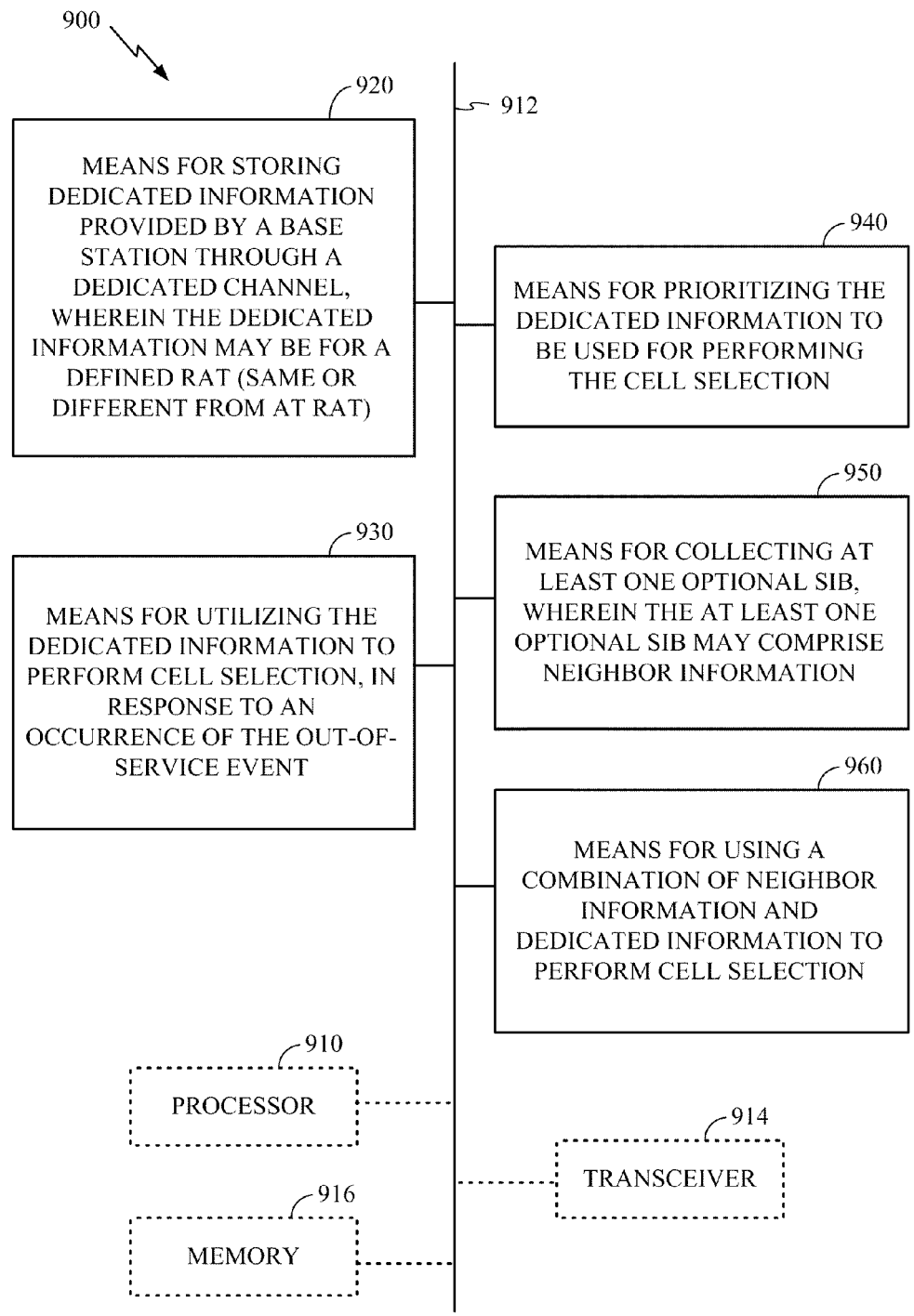
FIG. 9 illustrates another embodiment of an apparatus for expedited recovery from an out-of-service event.

With reference to FIG. 9, there is provided an exemplary apparatus 900 that implements a second recovery optimization technique, and that may be configured as either a communication device (e.g., an AT), or as a processor or similar device for use within a communication device.

As illustrated, apparatus 900 may comprise a means 920 for storing dedicated information provided by a base station through a dedicated channel. Apparatus 900 may comprise a means 930 for utilizing the dedicated information to perform cell selection, in response to an occurrence of the out-of-service event.

In related aspects, apparatus 900 may comprise a means 940 for prioritizing the dedicated information to be used for performing the cell selection, such as, for example, by giving higher priority to the dedicated information relative to any neighbor information.

In further related aspects, apparatus 900 may comprise: a means 950 for collecting at least one optional SIB, wherein the at least one optional SIB may comprise neighbor information; and a means 960 for using a combination of the neighbor information and the dedicated information to perform cell selection, in response to an occurrence of the out-of-service event.

It is noted that apparatus 900 may optionally include a processor module 910 having at least one processor, in the case of apparatus 900 configured as a communication network entity, rather than as a processor. Processor 910, in such case, may be in operative communication with means 920-960, and components thereof, via a bus 912 or similar communication coupling. Processor 910 may effect initiation and scheduling of the processes or functions performed by means 920-960, and components thereof Apparatus 900 may include a transceiver module 914 for communicating with other communication network entities, such as, for example, an eNB or the like. A stand alone receiver and/or stand alone transmitter may be used in lieu of or in conjunction with transceiver 914.

Apparatus 900 may optionally include a means for storing information, such as, for example, a memory device/module 916. Computer readable medium or memory device/module 916 may be operatively coupled to the other components of apparatus 900 via bus 912 or the like. The computer readable medium or memory device 916 may be adapted to store computer readable instructions and data for effecting the processes and behavior of means 920-960, and components thereof, or processor 910, or the methods disclosed herein.

The memory module 916 may optionally include executable code for the processor module 910 to (a) store dedicated information from a DSM or the like, and (b) utilize the dedicated information to perform cell selection, in response to an occurrence of the out-of-service event or the like.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and Blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   collecting at least one mandatory system information block from a base station prior to an out-of-service event, wherein the at least one mandatory system information block is required to be collected by an access terminal;
   collecting at least one optional system information block from the base station prior to the out-of-service event, the at least one optional system information block comprising neighbor information, wherein the at least one optional system information block is not required to be collected by the access terminal, and wherein the at least one mandatory system information block and the at least one optional system information block are the same type of information block;
   storing the at least one mandatory system information block and the at least one optional system information block comprising the neighbor information prior to the out-of-service event; and
   in response to an occurrence of the out-of-service event, using the neighbor information of the stored at least one optional system information block to perform cell selection.

2. The method of claim 1, wherein collecting the at least one optional system information block comprises collecting the at least one optional system information block during connected mode.

3. The method of claim 1, wherein collecting the at least one optional system information block comprises collecting the at least one optional system information block during idle mode.

4. The method of claim 1, further comprising prioritizing the neighbor information to be used for performing the cell selection.

5. The method of claim 4, wherein prioritizing comprises giving higher priority to ones of the neighbor information that are more current.

6. The method of claim 1, wherein the out-of-service event comprises a radio link failure.

7. The method of claim 1, wherein the method is performed by an access terminal.

8. The method of claim 7, wherein the neighbor information is for a defined radio access technology.

9. The method of claim 8, wherein the defined radio access technology comprises Long Term Evolution (LTE).

10. The method of claim 8, wherein the defined radio access technology is different from an access terminal radio access technology running on the access terminal, allowing the cell selection across multiple radio access technologies.

11. The method of claim 1, further comprising:
    receiving dedicated information from the base station through a dedicated channel;
    and storing the dedicated information.

12. The method of claim 11, wherein the base station comprises one of a macro base station, an access point base station, and an evolved Node-B.

13. The method of claim 11, further comprising utilizing a combination of the neighbor information and the dedicated information to perform the cell selection.

14. A method performed by an apparatus, comprising:
    receiving a request from a base station for handover of the apparatus to a neighbor base station;
    storing dedicated information provided by the base station through a dedicated channel prior to an out-of-service event, wherein the dedicated information comprises neighbor information of the base station, and wherein the neighbor information comprises information about another base station; and
    when the apparatus is unable to receive system information on a broadcast channel from the neighbor base station due to occurrence of the out-of-service event, utilizing the dedicated information received from the base station to perform cell selection of the another base station instead of handing over to the neighbor base station.

15. The method of claim 14, wherein storing comprises storing the dedicated information during connected mode.

16. The method of claim 14, wherein the base station comprises one of a macro base station, an access point base station, and an evolved Node-B.

17. The method of claim 14, further comprising prioritizing the dedicated information to be used for performing the cell selection.

18. The method of claim 17, wherein prioritizing comprises giving higher priority to the dedicated information provided by the base station relative to any neighbor information provided by other base stations.

19. The method of claim 14, wherein the out-of-service event comprises a radio link failure.

20. The method of claim 14, wherein the method is performed by an access terminal.

21. The method of claim 20, wherein the dedicated information is for a defined Radio Access Technology.

22. The method of claim 21, wherein the defined radio access technology comprises Long Term Evolution (LTE).

23. The method of claim 21, wherein the defined radio access technology is different from an access terminal radio access technology running on the access terminal, allowing the cell selection across multiple radio access technologies.

24. The method of claim 14, further comprising collecting at least one optional system information block, the at least one optional system information block comprising neighbor information of the neighbor base station.

25. The method of claim 24, further comprising using a combination of the neighbor information of the neighbor base station and the dedicated information to perform the cell selection.

26. A communication device, comprising:
a transceiver module for:
receiving at least one mandatory system information block from a base station prior to an out-of-service event, wherein the at least one mandatory system information block is required to be received;
receiving at least one optional system information block from the base station prior to the out-of-service event, the at least one optional system information block comprising neighbor information, wherein the at least one optional system information block is not required to be received, and wherein the at least one mandatory system information block and the at least one optional system information block are the same type of information block;
at least one processor operatively coupled with the transceiver module; and
a memory module operatively coupled with the at least one processor and comprising executable code for the at least one processor to:
store the at least one optional system information block; and
in response to an occurrence of the out-of-service event, use the neighbor information of the stored at least one optional system information block to perform cell selection.

27. The device of claim 26, wherein the at least one processor receives the at least one optional system information block during connected mode.

28. The device of claim 26, wherein the at least one processor receives the at least one optional system information block during idle mode.

29. The device of claim 26, wherein the at least one processor prioritizes the neighbor information to be used for performing the cell selection.

30. The device of claim 29, wherein the at least one processor gives higher priority to ones of the neighbor information that are more current.

31. The device of claim 26, wherein the out-of-service event comprises a radio link failure.

32. The device of claim 26, wherein the device comprises an access terminal.

33. The device of claim 32, wherein the neighbor information is for a defined radio access technology.

34. The device of claim 33, wherein the defined radio access technology comprises Long Term Evolution (LTE).

35. The device of claim 33, wherein the defined radio access technology is different from an access terminal radio access technology running on the access terminal, allowing the cell selection across multiple radio access technologies.

36. The device of claim 26, wherein the transceiver module receives dedicated information provided by the base station through a dedicated channel.

37. The device of claim 36, wherein the base station comprises one of a macro base station, an access point base station, and an evolved Node-B.

38. The device of claim 36, wherein the at least one processor utilizes a combination of the neighbor information and the dedicated information to perform the cell selection.

39. A communication device, comprising:
a transceiver module for receiving dedicated information from a dedicated signaling message provided by a base station prior to an out-of-service event and for receiving a request from the base station for handover of the communication device to a neighbor base station;
at least one processor operatively coupled with the transceiver module; and
a memory module operatively coupled with the at least one processor and comprising executable code for the at least one processor to:
store the dedicated information, wherein the dedicated information comprises neighbor information of the base station, and wherein the neighbor information comprises information about another base station; and
utilize the dedicated information received from the base station to perform cell selection to the another base station instead of handing over to the neighbor base station, when the communication device is unable to receive system information on a broadcast channel from the neighbor base station due to occurrence of the out-of-service event.

40. The device of claim 39, wherein the at least one processor stores the dedicated information during connected mode.

41. The device of claim 39, wherein the base station comprises one of a macro base station, an access point base station, and an evolved Node-B.

42. The device of claim 39, wherein the at least one processor prioritizes the dedicated information to be used for performing the cell selection.

43. The device of claim 42, wherein the at least one processor gives higher priority to the dedicated information provided by the base station relative to any neighbor information provided by other base stations.

44. The device of claim 39, wherein the out-of-service event comprises a radio link failure.

45. The device of claim 39, wherein the device comprises an access terminal.

46. The device of claim 45, wherein the dedicated information is for a defined radio access technology.

47. The device of claim 46, wherein the defined radio access technology comprises Long Term Evolution (LTE).

48. The device of claim 46, wherein the defined radio access technology is different from an access terminal radio access technology running on the access terminal, allowing the cell selection across multiple radio access technologies.

49. The device of claim 39, wherein the transceiver module receives at least one optional system information block, the at least one optional system information block comprising neighbor information of the neighbor base station.

50. The device of claim 49, wherein the at least one processor uses a combination of the neighbor information of the neighbor base station and the dedicated information to perform the cell selection.

51. An apparatus, comprising:
means for collecting at least one mandatory system information block from a base station prior to an out-of-service event, wherein the at least one mandatory system information block is required to be collected;
means for collecting at least one optional system information block from the base station prior to the out-of-service event, the at least one optional system information block comprising neighbor information, wherein the at least one optional system information block is not required to be collected, and wherein the at least one mandatory system information block and the at least one optional system information block are the same type of information block;

means for storing the at least one mandatory system information block and the at least one optional system information block comprising the neighbor information prior to the out-of-service event; and means for using the neighbor information of the stored at least one optional system information block to perform cell selection, in response to an occurrence of the out-of-service event.

52. The apparatus of claim 51, further comprising means for receiving dedicated information provided by the base station through a dedicated channel.

53. The apparatus of claim 52, wherein the base station comprises one of a macro base station, an access point base station, and an evolved Node-B.

54. The apparatus of claim 52, further comprising means for utilizing a combination of the neighbor information and the dedicated information to perform the cell selection.

55. An apparatus, comprising:
means for receiving a request from a base station for handover of the apparatus to a neighbor base station;
means for storing dedicated information from a dedicated signaling message provided by a base station prior to an out-of-service event, wherein the dedicated information comprises neighbor information of the base station, and wherein the neighbor information comprises information about another base station; and
means for utilizing the dedicated information received from the base station to perform cell selection of the another base station instead of handing over to the neighbor base station, when the apparatus is unable to receive system information on a broadcast channel from the neighbor base station due to occurrence of the out-of-service.

56. The apparatus of claim 55, further comprising means for receiving at least one optional system information block, the at least one optional system information block comprising neighbor information of the neighbor base station.

57. The apparatus of claim 56, further comprising means for using a combination of the neighbor information of the neighbor base station and the dedicated information to perform the cell selection.

58. A non-transitory computer-readable medium encoded with instructions executable to:
cause a computer to collect at least one mandatory system information from a base station block prior to an out-of-service event, wherein the at least one mandatory system information block is required to be collected;
cause the computer to collect at least one optional system information block from the base station prior to the out-of-service event, the at least one optional system information block comprising neighbor information, wherein the at least one optional system information block is not required to be collected, and wherein the at least one mandatory system information block and the at least one optional system information block are the same type of information block;
cause the computer to store the at least one mandatory system information block and the at least one optional system information block comprising the neighbor information prior to the out-of-service event; and
cause the computer to use the neighbor information of the stored at least one optional system information block to perform cell selection, in response to an occurrence of the out-of-service event.

59. The non-transitory computer-readable medium of claim 58, further encoded with instructions executable to cause the computer to receive dedicated information provided by the base station through a dedicated channel.

60. The non-transitory computer-readable medium of claim 59, wherein the base station comprises one of a macro base station, an access point base station, and an evolved Node-B.

61. The non-transitory computer-readable medium of claim 59, further encoded with instructions executable to cause the computer to utilize a combination of the neighbor information and the dedicated information to perform the cell selection.

62. A non-transitory computer-readable medium encoded with instructions executable to:
cause a computer to receive a request from a base station for handover of an apparatus to a neighbor base station;
cause the computer to store dedicated information from a dedicated signaling message provided by the base station prior to an out-of-service event, wherein the dedicated information comprises neighbor information of the base station, and wherein the neighbor information comprises information about another base station; and
cause the computer to utilize the dedicated information received from the base station to perform cell selection of the another base station instead of handing over to the neighbor base station, when the apparatus is unable to receive system information on a broadcast channel from the neighbor base station due to occurrence of the out-of-service event.

63. The non-transitory computer-readable medium of claim 62 further encoded with instructions executable to cause the computer to receive at least one optional system information block, the at least one optional system information block comprising neighbor information of the neighbor base station.

64. The non-transitory computer-readable medium 63 further encoded with instructions executable to cause the computer to use a combination of the neighbor information provided by the neighbor base station and the dedicated information to perform the cell selection.

* * * * *